Feb. 5, 1946. E. L. BEECHER 2,394,355
SHOCK ABSORBER
Filed Sept. 27, 1943
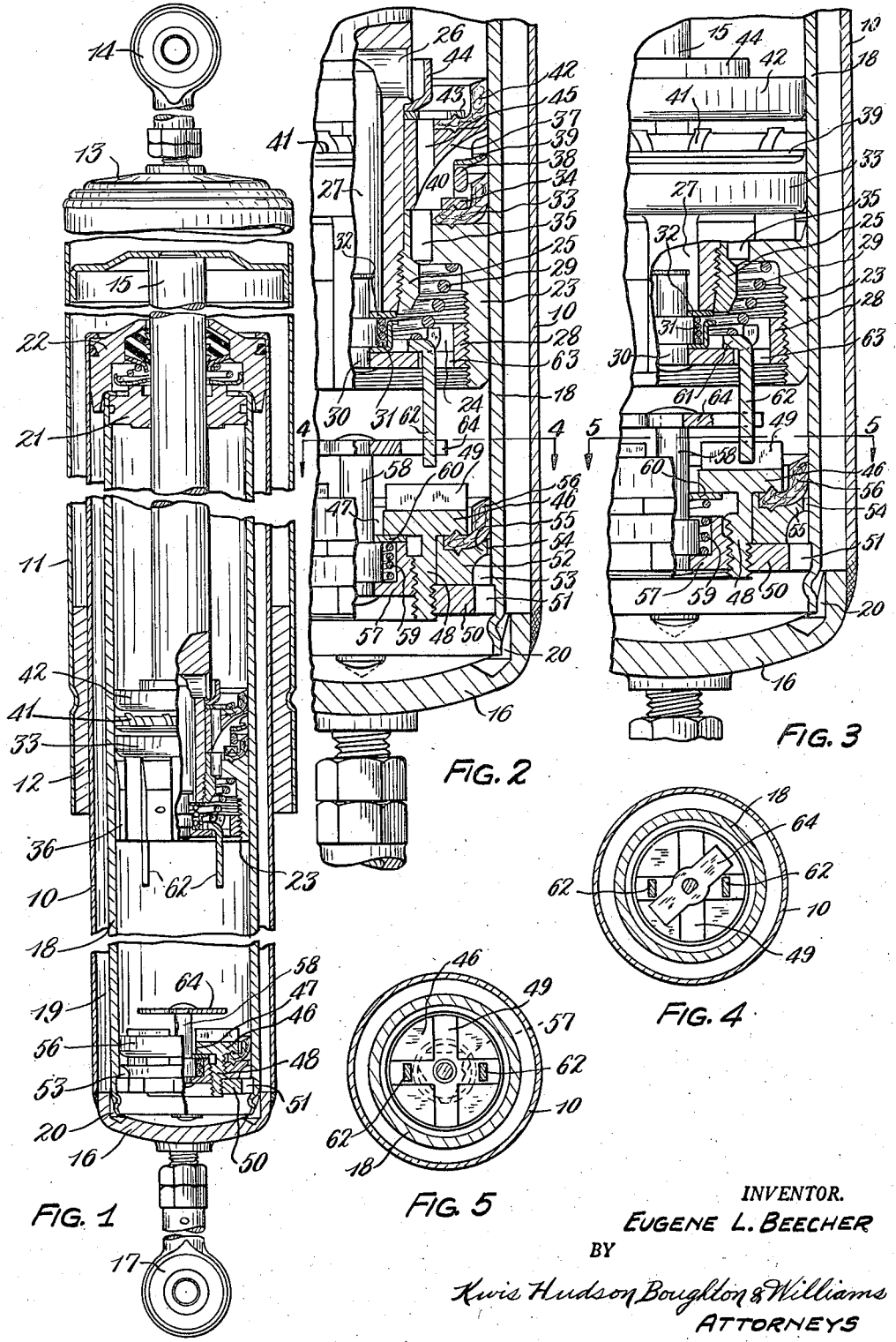
INVENTOR.
EUGENE L. BEECHER
BY
Kwis Hudson Boughton & Williams
ATTORNEYS Patented Feb. 5, 1946

2,394,355

UNITED STATES PATENT OFFICE 2,394,355

SHOCK ABSORBER

Eugene L. Beecher, Cleveland Heights, Ohio, assignor to The Gabriel Company, Cleveland, Ohio, a corporation of Ohio Application September 27, 1943, Serial No. 503,940

11 Claims. (Cl. 188—88)

This invention relates to fluid shock absorbers and more particularly to fluid shock absorbers of the direct acting tubular type.

An object of this invention is to provide an improved shock absorber of the character specified embodying novel means for adjusting its operating characteristics.

Another object is to provide a shock absorber of the type specified and wherein there is embodied a compression or impact valve and an expansion or recoil valve, together with means for imparting individual adjustments to said valves in accordance with the operating characteristics desired for the shock absorber.

Another object is to provide a shock absorber as specified in the last named object and wherein a single or common means is utilized for adjusting both the impact or compression valve and the recoil or expansion valve.

A further object is to provide in a shock absorber, as referred to in the above objects, means for effecting the individual adjustments of the impact or compression valve and the recoil or expansion valve in the approximate collapsed condition of the shock absorber and without disassembling the shock absorber.

A still further object is to provide a shock absorber of the type referred to and wherein both the compression or impact valve and the recoil or expansion valve are arranged concentrically with the axis of the device and employ in both valves the pressure equalizing valve pin disclosed and claimed in my Patent Re. 21,908, reissued September 30, 1941.

A still further object is to provide in a direct acting fluid shock absorber, impact or compression valve means and recoil or expansion valve means both of which are noiseless during the operation of the shock absorber.

A further object is to provide a direct acting fluid shock absorber employing both an impact or compression valve and a recoil or expansion valve and which valves can be individually adjusted without disassembling the shock absorber.

Another object is to provide an impact valve cage sub-assembly which is preferably concentric with the piston and in which, when desired, the impact valve can be preadjusted prior to mounting the sub-assembly in the shock absorber and the valve by the elimination of one part can be converted into a non-adjustable impact or compression valve.

Further and additional objects and advantages residing in the present invention and not hereinbefore specified will become apparent hereinafter in the detailed description which is to follow of a shock absorber embodying the invention and which is, in this instance, a direct double acting hydraulic shock absorber, and is illustrated in the accompanying drawing wherein:

Fig. 1 is a partly elevational and partly longitudinal sectional view of a hydraulic shock absorber embodying my invention and showing the impact or compression valve locked in closed position and the recoil or expansion valve closed but unlocked and capable of functioning.

Fig. 2 is a fragmentary view similar to Fig. 1, but on a larger scale, and illustrates both the impact or compression valve and the recoil or expansion valve locked in closed position and hence illustrates the relationship of the parts preparatory to adjusting the impact or compression valve for operation in the shock absorber.

Fig. 3 is a view similar to Fig. 2 but illustrates the impact or compression valve after it has been adjusted and is in a condition wherein it will operatively function during the operation of the shock absorber, while the adjustment means is shown in the proper position to effect adjustment of the recoil or expansion valve.

Fig. 4 is a transverse sectional view taken substantially on line 4—4 of Fig. 2, looking in the direction of the arrows, but is on a reduced scale from Fig. 2, and Fig. 5 is a transverse sectional view taken substantially on line 5—5 of Fig. 3, looking in the direction of the arrows, but on a reduced scale from Fig. 3.

The shock absorber embodying my invention and illustrated in the accompanying drawing will now be described in greater detail but it will be understood that the invention is not limited to this particular shock absorber and may be embodied in various other similar devices.

As previously stated, the shock absorber embodying the present invention and illustrated in the accompanying drawing is shown by way of illustration as of the direct double acting hydraulic type and comprises a substantially cylindrical casing 10 which has relative telescoping movement within a cylindrical housing or guard 11 that is spaced radially outwardly from the casing 10.

Suitable packing or other closure means 12 may be carried by the guard or housing 11 adjacent the open end of the latter, and said closure or packing means will have sliding engagement with the casing 10. The upper end of the guard 11 is closed as indicated at 13 and an eye 14 is operatively connected to the closed end 13 of the housing 11 and to a piston rod 15 in any preferred manner which need not be described herein since it forms no part of the present invention and is well understood in the art. The lower end of the casing 10 is closed by a cup-shaped closure member 16 which has secured to its outer side a lower eye 17. The closure member 16 fits within the lower end of the casing 10 and is secured thereto by suitable means, as for instance by welding, as well understood in the art.

In mounting the shock absorber upon a motor vehicle similar mounting pins or trunnion rods (not shown) may be connected, respectively, to the frame and axle of the vehicle in any suitable manner so as to extend outwardly therefrom in parallel relationship and pass through the eyes 14 and 17. These pins or rods may be operatively connected with the eyes 14 and 17 by suitable means well known in the art, wherefore relative movement between the frame and axle of the vehicle with compression and expansion of the vehicle springs will cause relative telescoping movements between the casing 10 and the guard or housing 11 and relative movement of the piston rod 15 in the pressure or working cylinder of the shock absorber as is well understood in the art.

The pressure or working cylinder 18 of the shock absorber is disposed within the casing 10 in spaced concentric relationship thereto so that the space defined by the casing 10, cylinder 18, closure member 16 and a closure member for the upper end of the casing (later to be referred to), constitutes a reservoir 19 for the oil or liquid in the shock absorber.

The lower end of the cylinder 18 extends into the cup-shaped closure member 16 and is secured thereto by suitable means as will be understood in the art. The cylinder 18 slightly upwardly of its lower end has secured therein an impact or compression valve cage sub-assembly later to be described in detail. The reservoir 19 is in communication with the space between the closure member 16 and the impact valve cage sub-assembly by means of a plurality of grooves 20 formed in the closure member 16 as fully explained in my Patent No. 2,263,284, issued November 18, 1941.

The upper or high pressure end of the cylinder 18 is closed by a plug member 21 having a centrally disposed opening arranged therein and through which the piston rod 15 slidably extends. The upper end of the casing 10 is closed by a closure member 22 mounted in the casing and suitably connected thereto and said closure member is provided with a central opening through which slidably extends the piston rod 15. The construction of the plug 21, closure member 22 and the gaskets and other parts associated therewith need not be set forth in detail herein as they form, per se, no part of the present invention and are fully illustrated and described in my said Patent No. 2,263,284.

The piston rod 15 has secured to its lower end a piston which, for the major part, is shown herein as corresponding in construction to the piston shown in my said Patent No. 2,263,284, it being understood that this form of piston construction is merely by way of illustration and other forms of pistons might be employed, as for instance, the piston shown in my copending application Serial No. 490,290, now Patent No. 2,369,007, issued Feb. 6, 1945. The piston comprises a portion 23 and which portion is provided on its lower side or end with a cylindrical recess 24 at the upper end of which recess is a centrally located extension 25 that surrounds the lower end of the piston rod 15 and is secured and locked thereto. A transverse opening 26 is formed in the piston rod 15 above the piston and this opening communicates with a longitudinally extending passage 27 that extends to the lower end of the piston rod and is in communication with the recess 24 in the piston portion or member 23.

An externally threaded cup-shaped plug 28 is screwed into the threads formed in the recess 24 of the piston portion 23 and said plug will be described in greater detail hereinafter. The plug 28 is maintained in different adjusted positions in the recess 24 by the tension of a relatively stiff coil spring 29 mounted in the recess and having one of its ends abutting against a member later to be referred to and engaging the inner side of the bottom of the plug 28 while the opposite end of said spring abuts against the piston portion 23. Rigidly connected to the bottom of the plug 28 is a centrally disposed pin 30 that extends upwardly into the passage 27 in the piston rod 15 and is concentric to the latter and to the piston. A small coil spring 31 surrounds an enlarged part of the pin 30 and has its upper end abutting against a plate valve 32 that is slidably mounted on the pin 30 concentrically to the pin, piston rod 15 and the piston and is held by the spring 31 normally seated against the lower end of the piston rod to seal the passage 27.

This arrangement of the pin 30 and valve plate 32 possesses a decided advantage. Flat valves ordinarily have a tendency to crack open on one side first, with the result that in order to accommodate the volume of expanded fluid, the movement of the valve sidewise is more than if the valve opened evenly. This sidewise opening movement of the valve causes valve flutter and often produces in shock absorbers thumping noises. The use of adequate guides for the valve may correct this fault but the guides cause objectionable weight to be introduced into the shock absorber. The pin 30 has a relatively large diameter and since it extends concentrically into the passage 27 an annular space is provided between the pin and the wall of the passage. Therefore, the valve 32 has an exposed pressure area of annular shape and located substantially near the circumference of the valve, wherefore there will be an even pressure distribution on the valve 32 and the latter will move to and from its seat in parallel relation to the axis of the pin 30 and the plate of the valve will be substantially perpendicular to said axis. Also, since the area of the valve is reduced by the area of the pin 30, a much lighter spring pressure is required for the expelled volume of oil. The advantages of this construction are set forth in greater detail in my said Patent Re. 21,908.

A cup-shaped member has its bottom secured between the enlarged portion of the pin 30 and the inner side of the bottom of the plug 28 and the spring 31 is housed in this cup-shaped member and said member prevents a complete collapse of the spring 31 when the valve 32 is moved to closed locked position against its valve seat by the manual adjustment of the plug 28, later to be referred to.

A flexible cup packing ring 33, which may be formed of synthetic rubber, leather or other suitable material, is arranged on the upper end of the piston portion or member 23 and is held in position thereon by means of an annular washer 34 which, in turn, is held in position by another piston portion later to be referred to. One or more small passages 35 extend through the piston portion 23 and communicate with the space above said portion and with the recess 24, there usually being eight equally spaced passages 35 formed in the piston portion 23. The piston portion 23 is provided on its periphery with a plurality of longitudinally extending grooves 36 which are spaced circumferentially of the piston portion and extend from the lower end of the piston portion to the upper end thereof and terminate beneath the cup packing ring 33 which overlies said grooves. The purpose of the grooves 36 will later be explained in greater detail.

A second piston portion which might be termed a piston head is indicated at 37 and is fixed on the piston rod 15 above the portion 23 and has its lower end in engagement with the upper end of the portion 23 and is connected thereto. The end of the portion or piston head 37 adjacent to the piston portion 23 is reduced in diameter and is shouldered to bear upon the washer 34. Above the washer 34 the periphery of the piston head 37 is provided with a second annular shoulder and defines with the cup-shaped packing ring 33 an annular space in which is located a split expansion ring 38 which bears against the inner surface of the wall of the flexible packing ring 33 with a predetermined pressure and is held in position by a retainer 39 which, in turn, is clamped in position by the last mentioned annular shoulder portion of the periphery of the piston head 37. The piston head 37, at its inner or upper end, is slightly dished to provide a rim portion contacting on the periphery with the inner surface of the working cylinder 18. The piston head or portion 37 is also provided with a plurality of circumferentially spaced channels 40 that extend downwardly and inwardly from just below the rim to the inner or lower end of the portion 37. There are preferably eight of these channels 40 and they overlie and are in communication with the passages 35 in the piston portion 23. The channels 40 at their upper ends are in communication with peripheral grooves 41 formed in the rim of said portion 37 and extending to the upper end thereof. The grooves 41 are of greater arcuate width than the channels 40 and form a plurality of passages between the piston head 37 and the inner surface of the cylinder 18 and connect the upper ends of the channels 40 with the interior of the working cylinder above the piston.

The dished end of the piston head 37 has mounted thereon a flexible cup packing ring 42 similar to the ring 33 and the wall of said ring 42 engages the inner surface of the cylinder 18. An annular clamping member 43 clamps the flexible cup packing ring 42 in position on the upper end of the portion 37 while a small cup member 44 is locked in position on the piston rod just above the member 43 and this cup is of such size as to partially surround the opposite ends of the opening 26 and acts as a stop when the shock absorber is fully extended to prevent damage to the parts. The member 43 is provided with spaced openings therein and one of said openings overlies a small passage 45 formed in the piston head 37 and extending from the dished end thereof into one of the channels 40 that overlies one of the small passages 35 in the piston portion 23. Thus said one passage 35 and the passage 45 are in communication with each other with the result that portions of the working cylinder on opposite sides of the piston always have a constant restricted communication with each other and through which oil may flow as the piston moves in either direction in the cylinder 18.

Assuming that the shock absorber is mounted upon a motor vehicle and is filled with liquid such as oil, it will be understood that when the wheels of the vehicle strike an irregularity or bump in the roadway, the impact will compress the vehicle's springs and cause the axle to move toward the chassis with a resultant downward movement, as viewed in the drawing, of the piston in the cylinder 18. During this downward movement of the piston on the impact or compression stroke the oil in the cylinder flows through the passages 35 in the piston portion 23 and through the channels 40 and peripheral grooves 41 and between the wall of the cupped packing ring 42 and the wall of the cylinder 18. The liquid also flows through the single constantly opened orifice or passage 45 in the piston head 37. In other words, there is a relatively free flow of liquid from below the piston to above the piston during the impact or compression stroke. During the impact or compression stroke the oil will pass upwardly of the peripheral grooves 36 of the piston portion 23 but no substantial part of this oil will pass the cupped packing ring 33, due to the action of the split expansion ring 38 which maintains the packing ring in tight sealing engagement at all times with the inner wall of the cylinder 18. The split expansion ring 38 creates a predetermined pressure or frictional resistance to the movement of the piston in either direction as fully explained in my said Patent No. 2,263,284. After the vehicle's springs have been compressed by the impact, said springs expand or recoil and this results in the piston moving upwardly in the cylinder 18. In the course of the upward movement of the piston during the recoil or expansion stroke, the pressure of the oil on the upper side of the piston forces the wall of the cupped packing ring 42 tightly against the wall of the cylinder 18 and the grooves 41 and channels or passages 40 are sealed against the flow of oil therethrough by said packing ring 42. As the piston moves upwardly in the cylinder, the oil may flow only through the single fixed orifice or passage 45 to the lower side of the piston. Also during the recoil stroke of the piston the oil from the upper side of the piston will pass into the opening 26 and the passage 27 in the piston rod 15 but cannot pass to the under side of the piston as long as the lower end of the passage 27 is sealed or closed by the recoil plate valve 32. However, as soon as the pressure of the oil above the piston reaches a predetermined amount during the course of the recoil stroke which is sufficient to overcome the adjusted or selected tension of the spring 31, then the recoil valve 32 will move from its seat under the pressure of the oil and the oil can flow from the upper side of the piston to the lower side thereof through the opening 26 and the passage 27 in the piston rod. The manner in which the tension of the recoil valve spring 31 can be adjusted will be described after the description of the impact or compression valve cage sub-assembly, which follows immediately.

Said compression valve cage sub-assembly comprises a valve head or member 46 which is annular in shape and is provided with a central opening 47. This valve head 46 is provided on one side with an annular or cylindrical skirt 48 that is internally and externally threaded as indicated in the drawing and extends toward the member 16. The member 46 on its side opposite to the side having the skirt 48 is provided with diametrically extending channels or slots 49 arranged perpendicularly to each other as clearly shown in Figs. 4 and 5 and the purpose of which will later become apparent.

A disk retaining nut 50 is secured in the lower end of the cylinder 18 and its periphery is provided with a plurality of circumferentially spaced notches or recesses 51 forming openings or passages between the nut 50 and the cylinder 18. The external threads of the skirt 48 of the member 46 are screwed into the nut 50 as shown in the drawing. An annular ring-like retaining member 52 is clamped between the member 46 and the nut 50 and surrounds the skirt 48. This member has its periphery curved inwardly as indicated at 53 and the space thus provided communicates with a plurality of rather broad circumferentially spaced notches or recesses 54 formed in the rim portion 55 of the member 52. A cup-shaped packing ring 56 similar to the rings 33 and 42 is clamped between the lower side of the member 46 and the upper side of the member 52, and the exterior wall of said ring contacts the inner surface of the cylinder 18 above the recesses or notches 54. An externally threaded member 57 which is substantially triangular in configuration, as indicated in Fig. 5, and which member may be termed the impact valve adjusting screw, is screwed into the internal threads of the skirt 48 of the member 46. An impact valve pin 58 similar to the recoil valve pin 30 is fixedly secured to the member 57 and extends upwardly of the cylinder 18 through the opening 47 in the member 46. The pin 58 has an enlarged portion within the member 57 which is surrounded by an impact valve spring 59, one end of which spring abuts the member 57 and the other end of which abuts the impact plate valve 60 similar to the recoil plate vlave 32. The impact valve 60 seats against the underside of the member 46 and when seated seals the opening 47 in said member and prevents the passage of oil therethrough. The valve pin 58, valve 60 and opening 47 are concentric to the similar parts of the recoil valve and to the cylinder 18, piston rod 15 and the piston. The adjusting member 57 can be screwed inwardly or outwardly of the skirt 48 to vary the tension of the spring 59 and thus adjust or change the pressures required to unseat the valve 60.

During the impact or compression stroke of the piston i. e., its downward stroke in the cylinder 18, the pressure of the oil below the piston expands the flexible packing ring 56 tightly against the inner surface of the cylinder 18 and no oil will pass between said ring and through the recesses 54, space 53 and passages 51 and into the space between the impact valve cage subassembly of the closure member 16. As long as the impact valve 60 remains closed, no oil will pass through the opening 47 to the lower side of the impact valve sub-assembly. However, as soon as the pressure of the oil below the piston during the impact stroke of the latter, attains to the predetermined pressure required to open the valve 60, the latter will be unseated and said oil will then pass through the impact valve sub-assembly by way of the opening 47, the interior of the skirt 48 and will then flow into the reservoir 19 through the grooves 20. During the recoil or expansion stroke of the piston, i. e., when the piston is moved upwardly in the cylinder 18, the valve 60 remains closed during the entire stroke and oil flows freely from the reservoir into the cylinder 18 through the passages 51, space 53, recesses or notches 54 and between the cylinder 18 and the flexible packing ring 56. This free flow of oil as just referred to replenishes the oil in the working cylinder below the piston with oil drawn from the reservoir and prevents the creation of a vacuum in such portion of the cylinder during the recoil or compression stroke.

If desired, the compression or impact valve cage subassembly may be provided with a fixed orifice allowing a predetermined but small amount of oil to flow therethrough during both the impact and recoil strokes of the piston as will be understood by those skilled in the art.

As will be understood from the foregoing description, the resistance to be developed by the shock absorber on the recoil or expansion stroke can be adjusted or varied as desired by varying the compression of the recoil valve spring 31. This may be done by screwing the plug 28 into or out of the threaded chamber in the piston portion 23.

I contemplate accomplishing such adjustment by means of an adjusting member 61 mounted in the piston. This adjusting member 61 may be fixed against movement relative to the piston or it may be movable relative to the piston against spring tension as disclosed in the copending application of Donald L. Christofel, Ser. No. 427,783 and as shown and described herein.

The adjusting member 61 is in the form of a dished disk having a central opening in which the valve pin 30 and valve spring housing cup are located. The member 61 is located within the plug 28 and acts as the abutment for one end of the large coil spring 29. The member 61 is provided with arms 62 which in the present illustration are two in number and are diametrically disposed with respect to each other. The arms 62 project through openings 63 in the plug 28 and it will be seen that when the shock absorber is collapsed fully the lower ends of these arms 62 may be positioned in the slots 49 of the valve head member 46, as shown in Figs. 3 and 5. When the arms 62 are thus engaged in the slots 49, and relative rotation is imparted to the piston rod and piston and the cylinder 18 the plug 28 will be rotated relative to the piston and be screwed inwardly or outwardly to vary the tension of the spring 31 and the pressure required to open the recoil valve 32.

The adjusting member 61 may also be utilized to adjust the compression of the impact or compression valve spring 59, without disassembling the shock absorber. An impact valve adjusting key 64 is fixed to the upper end of the impact valve pin 58 and said key extends diametrically of the working chamber at the lower end of the cylinder 18. Since the key 64 is fixed to the valve pin 58 and the latter is fixed to the adjusting screw 57, it is seen that rotation of the key 64 will rotate the screw 57 and cause the latter to screw inwardly or outwardly of the skirt 48 to vary the compression of the impact valve spring 59 and the fluid pressure required to open the impact valve 60.

When the shock absorber is partially collapsed as shown in Fig. 2, the arms 62 of the adjusting member 61 are not engaged in the slots 49 but are in position to engage opposite sides of the key 64, as indicated in Fig. 4, and if the plug 28 rotates with the piston adjusting rotation can be imparted to the screw 57 through the key 64 by the arms 62.

The adjustments of the recoil and impact valves 32 and 60 are made in the following manner:

The shock absorber is collapsed until the arms 62 of the adjustment member 61 are engaged in the slots 49 of the nonrotatable member 46 and hence said arms 62 and the plug 28 are held now against rotation relative to the cylinder 18. The piston rod 15 and piston are then rotated relative to the cylinder 18 in an anticlockwise direction causing the stationary plug 28 to have relative clockwise rotation with respect to the piston. This causes the plug 28 to screw outwardly of the piston and decreases the compression of the recoil valve spring 31. The anticlockwise rotation of the piston rod and piston is continued until the recoil valve 32 is capable of opening under fluid pressure, as indicated in Fig. 1. It will be understood that this anticlockwise rotation of the piston rod and piston does not impart any rotation to the adjusting key 64 for the impact valve as the arms 62 are held against rotation relative to the cylinder 18 by their engagement in the slots 49.

The piston is now withdrawn to disengage the arms 62 from the slots 49 although the arms still extend past the key 64. The anticlockwise relative rotation of the piston rod and piston is continued but now the arms 62 are not held positively against rotation since they are not engaged in the slots 49. Therefore, the plug 28, adjusting member 61 and its arms 62 will rotate with the piston in an anticlock direction and relative to the cylinder 18, it being recalled that the large spring 29 creates a frictional interlock between the threads of the plug and piston. The anticlockwise movement of the arms 62 causes the key 64 to rotate in an anticlockwise direction with a resultant anticlockwise rotation of the screw 57. This rotation of the piston is continued until the screw 57 has been screwed inwardly to its full limit and the impact valve 60 is locked closed as shown in Figs. 1 and 2.

The piston is now forced back to the fully collapsed position wherein the arms 62 are again engaged in the slots 49 and the plug 28 is held positively against rotation relative to the cylinder 18. The piston rod and piston are now rotated in a clockwise direction relative to the cylinder 18. This causes the plug 28 to rotate relative to the piston in an anticlockwise direction and to screw inwardly of the piston until the recoil valve 32 is locked in closed position. At this time both the impact valve 60 and the recoil valve 32 are locked in closed position as shown in Fig. 2 and may be adjusted for operation as follows:

The shock absorber is collapsed sufficiently to engage the arms 62 with the key 64 but not with the slots 49 (see Fig. 2). The piston rod and piston are now rotated in a clockwise direction relative to the cylinder 18 and the plug 28 and arms 62 rotate with the piston and impart clockwise rotation to the key 64 and screw 57. This results in the screw 57 screwing outwardly of the sleeve 48 to relieve the compression of the spring 59 and prepare the impact valve 60 to respond to a predetermined fluid pressure. The clockwise rotation is continued until the proper and desired adjustment has been imparted to the impact valve 60. The parts of the impact valve are now as shown in Fig. 3.

The shock absorber then is fully collapsed and the arms 62 are engaged in the slots 49 as indicated in Fig. 3. The piston rod and piston are rotated in an anticlockwise direction relative to the cylinder 18 with the result that the plug 28 screws outwardly of the portion 23 of the piston and the recoil valve 32 is adjusted to open at the desired and predetermined pressure. In this connection it will be understood that during this latter adjustment the arms 62 and plug 28 are held positively against rotation and therefore the key 64 is not rotated and the prior adjustment of the impact valve is not disturbed.

From the foregoing it will have been seen that both the recoil valve and the impact valve can be adjusted by merely collapsing or partially collapsing the shock absorber and rotating the piston rod and piston in the proper direction relative to the cylinder 18. The adjustments of the valves do not require the disassembly of the shock absorber. The adjustment of the impact valve 60 by the adjusting member 61 for the recoil valve 32 requires only the use of a single additional part, namely, the adjusting key 64. Conversely, if it were not desired to have the impact valve adjustable in the manner described, the key 64 might be omitted and the impact valve preadjusted prior to the assembly of the shock absorber.

Although the adjustment of both the recoil valve and the impact valve is carried out by common means, such valves can nevertheless be given individual and differing adjustment to provide in the shock absorber the operating characteristics desired.

The recoil valve and the impact valve are both concentric with the axis of the shock absorber and embody the pressure equalizing valve pins 30 and 58 and therefore both are noiseless in operation.

Although a preferred embodiment of the invention has been illustrated and described herein, it will be understood that the invention is susceptible to such modifications and adaptations as come within the scope of the appended claims.

Having thus described my invention, I claim:

1. In a double acting fluid shock absorber, a working cylinder, a piston movable in said cylinder, a plurality of valves carried in part by said piston and in part by said cylinder, separate means within said cylinder for adjusting each of said valves, and means within said cylinder for actuating selectively said separate adjusting means and including an element which functions in the actuation of any of said separate means and elements which individually function in the actuation of only one of said separate means.

2. In a double acting fluid shock absorber, a working cylinder, a piston movable in said cylinder, a plurality of valves carried in part by said piston and in part by said cylinder, separate means within said cylinder for adjusting each of said valves, and means within said cylinder for actuating selectively said separate adjusting means by relative rotation between the piston and cylinder and including an element functioning in the actuation of any of said adjusting means depending upon the relative position of the piston in said cylinder and elements which individually function in the actuation of only one of said adjusting means.

3. In a double acting fluid shock absorber, a working cylinder, a piston movable in said cylinder, a pair of valves one carried by said piston and the other by said cylinder, separate means within said cylinder for adjusting each of said valves, and means within said cylinder for actuating selectively said separate adjusting means and including an element which functions in the actuation of either of said separate adjusting means and elements which individually function in the actuation of only one of said adjusting means.

4. In a double acting fluid shock absorber, a working cylinder, a piston movable in said cylinder, a pair of valves one carried by said piston and the other by said cylinder, separate means within said cylinder for adjusting each of said valves, and means within said cylinder for actuating selectively said separate adjusting means by relative rotation between the piston and cylinder and including an element which functions in the actuation of either of said separate adjusting means depending upon the relative position of the piston in said cylinder and elements which individually function in the actuation of only one of said adjusting means.

5. In a double acting fluid shock absorber, a working cylinder, a piston movable in said cylinder, a pair of valves operatively associated with said piston and cylinder, separate spring means for each of said valves, separate rotatable means for adjusting the action of each of said spring means, and means for rotating selectively said rotatable means by relative rotation between the piston and cylinder, and including an element functioning selectively in the rotation of either of said rotatable means depending upon the relative position of said piston in said cylinder and elements which individually function in the rotation of only one of said rotatable means.

6. In a double acting fluid shock absorber, a working cylinder, a reservoir operatively associated with said cylinder, a piston movable in said cylinder, a recoil valve operatively associated with said piston and an impact valve operatively associated with said cylinder, separate means within said cylinder for adjusting said valves, means within said cylinder for actuating the adjusting means for the recoil valve, and means for actuating the adjusting means for the impact valve, said last two means having a common element selectively functioning with one or the other of said adjusting means.

7. In a double acting fluid shock absorber, a working cylinder, a reservoir operatively associated with said cylinder, a piston movable in said cylinder, a recoil valve operatively associated with said piston and an impact valve operatively associated with said cylinder, separate means within said cylinder for adjusting said valves, means within said cylinder for actuating the adjusting means for the recoil valve by relative rotation between the piston and cylinder, and means for actuating the adjusting means for the impact valve by relative rotation between the piston and cylinder, said last two means having a common element selectively functioning with one or the other of said adjusting means depending upon the longitudinal position of the piston in the cylinder.

8. In a double acting fluid shock absorber, a working cylinder, a reservoir operatively associated with said cylinder, a piston movable in said cylinder, a spring pressed impact valve operatively associated with said cylinder, a spring pressed recoil valve operatively associated with said piston, means for adjusting said impact valve and including a rotatable element, means for adjusting said recoil valve and including a rotatable element, and means for selectively rotating either of said elements and including a clutch portion fixed with respect to said cylinder, a rotatable member operatively associated with the rotatable adjusting element for said impact valve, and a driving member carried by the rotatable adjusting element for the recoil valve and engageable either with said clutch portion or said rotatable member depending upon the relative position of said piston in said cylinder, wherefore either of said valves may be selectively adjusted by relative rotation between the piston and cylinder.

9. In a double acting fluid shock absorber, a working cylinder, a closure for one end of said cylinder, a piston movable in said cylinder and having a passage therethrough, a valve for closing said passage, spring means acting to seat said valve, means for adjusting the action of said spring means, elements carried by said piston and closure and cooperating when said piston is in a certain position in said cylinder and upon relative rotation between said piston and cylinder to effect actuation of said adjusting means, said closure having a passage therethrough, a valve for closing said passage, spring means acting to seat said valve, means for adjusting the action of said last named spring means, and an element operatively connected with said last adjusting means and engageable by the element carried by the piston in another position of the piston in said cylinder wherefore relative rotation between said piston and cylinder also effects actuation of the spring adjusting means carried by said closure.

10. In a fluid shock absorber a working cylininder, a closure for an end of said cylinder and having a passage therethrough and also peripheral grooves extending from end to end of the closure, a piston reciprocable in said cylinder, a spring pressed valve for closing said passage, valve means carried by said closure for closing one end of said peripheral grooves during movement of said piston in one direction and automatically opening said one end of said grooves during movement of the piston in the opposite direction.

11. In a double acting shock absorber, a working cylinder, a closure located in said cylinder adjacent one end thereof, a casing enclosing said cylinder including said one end thereof and providing with said cylinder a reservoir in communication with the space between said casing and said closure, a piston movable in said cylinder, said closure being provided with an opening therethrough and having peripheral passages, with said opening and passages communicating with the interior of said cylinder and the space between said closure and casing, a spring pressed impact valve controlling the flow of fluid through said opening, and a cup packing member carried by said closure and engaging the interior surface of said cylinder and acting during the impact stroke of the shock absorber to close said peripheral passages and during the recoil stroke of the shock absorber to open said passages and function as a replenishing valve.

EUGENE L. BEECHER.